(12) United States Patent
Yoshizawa

(10) Patent No.: US 11,165,931 B2
(45) Date of Patent: Nov. 2, 2021

(54) IMAGE FORMING APPARATUS AND STORAGE MEDIUM FOR HIGH-ACCURACY COLORIMETRY

(71) Applicant: KONICA MINOLTA, INC., Tokyo (JP)

(72) Inventor: Masanori Yoshizawa, Hino (JP)

(73) Assignee: KONICA MINOLTA, INC., Tokyo (JP)

( * ) Notice: Subject to any disclaimer, the term of this patent is extended or adjusted under 35 U.S.C. 154(b) by 0 days.

(21) Appl. No.: 16/876,801

(22) Filed: May 18, 2020

(65) Prior Publication Data
US 2020/0280656 A1    Sep. 3, 2020

Related U.S. Application Data

(63) Continuation of application No. 15/722,537, filed on Oct. 2, 2017, now Pat. No. 10,701,245.

(30) Foreign Application Priority Data

Oct. 4, 2016    (JP) .............................. JP2016-196090

(51) Int. Cl.
*H04N 1/60*    (2006.01)

(52) U.S. Cl.
CPC ......... *H04N 1/6041* (2013.01); *H04N 1/6008* (2013.01); *H04N 1/6033* (2013.01); *H04N 1/6044* (2013.01); *H04N 2201/0081* (2013.01)

(58) Field of Classification Search
CPC combination set(s) only.
See application file for complete search history.

(56) References Cited

U.S. PATENT DOCUMENTS 5,953,990 A * 9/1999 Chalmers ............. H04N 1/4078
101/211
7,505,173 B2    3/2009 Viturro et al.
(Continued)

FOREIGN PATENT DOCUMENTS

CN       102213618 A    10/2011
CN       105282391 A    1/2016
(Continued)

OTHER PUBLICATIONS

Office Action dated Jan. 22, 2019, by the China National Intellectual Property Administration in corresponding Chinese Patent Application No. 201710919724.X and English translation of the Office Action. (22 pages).
(Continued)

*Primary Examiner* — Barbara D Reinier
(74) *Attorney, Agent, or Firm* — Buchanan Ingersoll & Rooney PC

(57) ABSTRACT

An image forming apparatus that prints an adjustment pattern on a sheet includes a generator and an image former. The adjustment pattern is for correcting a color value obtained by reading a second patch region on the sheet with a second reader based on a color value obtained by reading a first patch region on the sheet with a first reader. The generator generates image data of the adjustment pattern, and the image former performs printing based on the image data. The adjustment pattern includes a first patch printed in the first patch region and a second patch printed in a region other than the first patch region in the second patch region. The second patch includes a common color patch in a same color as a color of the first patch, and a size of the first patch is larger than a size of the second patch.

15 Claims, 7 Drawing Sheets

(56) References Cited

U.S. PATENT DOCUMENTS

| | | |
|---|---|---|
| 7,800,779 B2 | 9/2010 | Fan et al. |
| 9,906,689 B2 | 2/2018 | Sakatani |
| 9,979,860 B2 | 5/2018 | Yamaguchi |
| 2002/0071120 A1 | 6/2002 | Tamagawa |
| 2003/0214661 A1 | 11/2003 | Kondo |
| 2006/0285134 A1 | 12/2006 | Viturro et al. |
| 2007/0002344 A1* | 1/2007 | Klassen ............. H04N 1/00045 358/1.9 |
| 2015/0350493 A1 | 12/2015 | Sakatani |
| 2016/0269598 A1 | 9/2016 | Hayashi et al. |
| 2017/0251129 A1 | 8/2017 | Sakatani |
| 2017/0310854 A1 | 10/2017 | Yamaguchi |
| 2017/0353630 A1 | 12/2017 | Tsuji et al. |
| 2018/0013926 A1 | 1/2018 | Yamaguchi |
| 2018/0097973 A1 | 4/2018 | Yoshizawa |
| 2018/0338067 A1 | 11/2018 | Kuroiwa |

FOREIGN PATENT DOCUMENTS

| | | |
|---|---|---|
| CN | 105959501 A | 9/2016 |
| JP | 2015226128 A | 12/2015 |

OTHER PUBLICATIONS

Non-Final Office Action issued by the U.S. Patent and Trademark Office, dated Jun. 27, 2019 for U.S. Appl. No. 15/967,756.

* cited by examiner

IMAGE FORMING APPARATUS AND STORAGE MEDIUM FOR HIGH-ACCURACY COLORIMETRY

CROSS-REFERENCE TO RELATED APPLICATIONS

The present application is a continuation of, and claims priority benefit to, U.S. patent application Ser. No. 15/722,537, filed Oct. 2, 2017, which claims priority to Japanese Patent Application No. 2016-196090, filed Oct. 4, 2016. Each of the above referenced applications is herein incorporated by reference in their entirety.

BACKGROUND

1. Technological Field

The present invention relates to an image forming apparatus and a storage medium.

2. Description of the Related Art

In image forming apparatuses, there has been recently used a technique of setting an image reading device such as a line sensor on a sheet conveyance path of a sheet after image formation, reading color patches on the sheet by the image reading device and feeding back the reading results to an image forming condition for performing image output stably.

Calibration of the image reading device has also been performed by measuring common color patches with a spectrophotometer and the image reading device. For example, there has been used a technique of obtaining reading results of patches which can be read by both of a colorimeter that reads a partial region in a main scanning direction and a scanner that reads over the image forming width in the main scanning direction, obtaining errors between the reading results by the scanner and the reading results by the colorimeter, feeding back the errors as correction values and thereby improving measurement accuracy of the patches that were read by only the scanner (not measured by the colorimeter) (see Japanese Patent Application Laid-Open Publication No. 2015-226128).

By associating the output values of the scanner with the output values of the colorimeter, colorimetry can be performed efficiently by using the scanner.

However, even if a same color is read, the RGB value obtained by reading, with the scanner, a patch included in the reading region for only the scanner is possibly different from the RGB value obtained by reading, with the scanner, a patch included in the common reading region for the colorimeter and the scanner due to the influence of flare and irregularities in the surface of the scanner.

For example, when the output value (average pixel value) of green by the scanner is "230/255" with respect to a white patch (white portion of the sheet) which is included in the common reading region, there are some cases where, due to the influence of flare, the output value of green by the scanner is "200/255" with respect to a white patch (in the same color as the white patch included in the common reading region) which is included in the reading region for only the scanner, and the density is detected to be higher.

In this case, when the scanner is adjusted to the colors measured by the colorimeter on the basis of the output value for the common reading region, the obtained measurement value for the white patch included in the reading region for only the scanner is a value indicating white which is darker than actual.

In this way, the above conventional techniques have had a problem that an error is caused in calibrating a scanner using a colorimeter and that the scanner cannot measure the colors accurately. When color correction of the image forming apparatus is performed with the error, highly-accurate color correction cannot be achieved finally.

SUMMARY

The present invention has been made in consideration of the above problems in the conventional techniques, and an object of the present invention is to perform colorimetry with high accuracy and high efficiency.

To achieve at least one of the abovementioned objects, according to an aspect of the present invention, an image forming apparatus reflecting one aspect of the present invention comprises: an image former which forms an adjustment pattern on a sheet; a first reader which is disposed on a conveyance path of the sheet and outputs a first color value by reading the adjustment pattern, and a second reader which is disposed on the conveyance path of the sheet and outputs a second color value that is different from the first color value by reading the adjustment pattern; and a hardware processor, wherein the first reader reads a partial region in a sheet width direction, the second reader is capable of reading an entire region in the sheet width direction, the adjustment pattern has a first patch region in which a patch that is readable by the first reader is arranged and a second patch region in which a patch that is readable by only the second reader is arranged, the second patch region includes at least a common color patch which is a patch in a same color as a color of the patch included in the first patch region, the hardware processor obtains an estimate first color value by converting a second color value of each patch in the second patch region which is output by the second reader into a first color value, the hardware processor obtains a correction value of the estimate first color value for each of the common color patch by comparing a first color value of each patch in the first patch region which is output by the first reader with the estimate first color value obtained from the common color patch in the second patch region corresponding to each patch in the first patch region, and the hardware processor corrects the estimate first color value obtained from every patch in the second patch region based on the correction value of the estimate first color value obtained for each of the common color patch.

BRIEF DESCRIPTION OF THE DRAWINGS

The advantages and features provided by one or more embodiments of the invention will become more fully understood from the detailed description given hereinafter and the appended drawings which are given by way of illustration only, and thus are not intended as a definition of the limits of the present invention, and wherein.

DETAILED DESCRIPTION OF EMBODIMENTS

Hereinafter, one or more embodiments of the present invention will be described with reference to the drawings. However, the scope of the invention is not limited to the disclosed embodiments.

First Embodiment

First, a first embodiment of an image forming apparatus according to the preset invention will be described.

Figure 1:
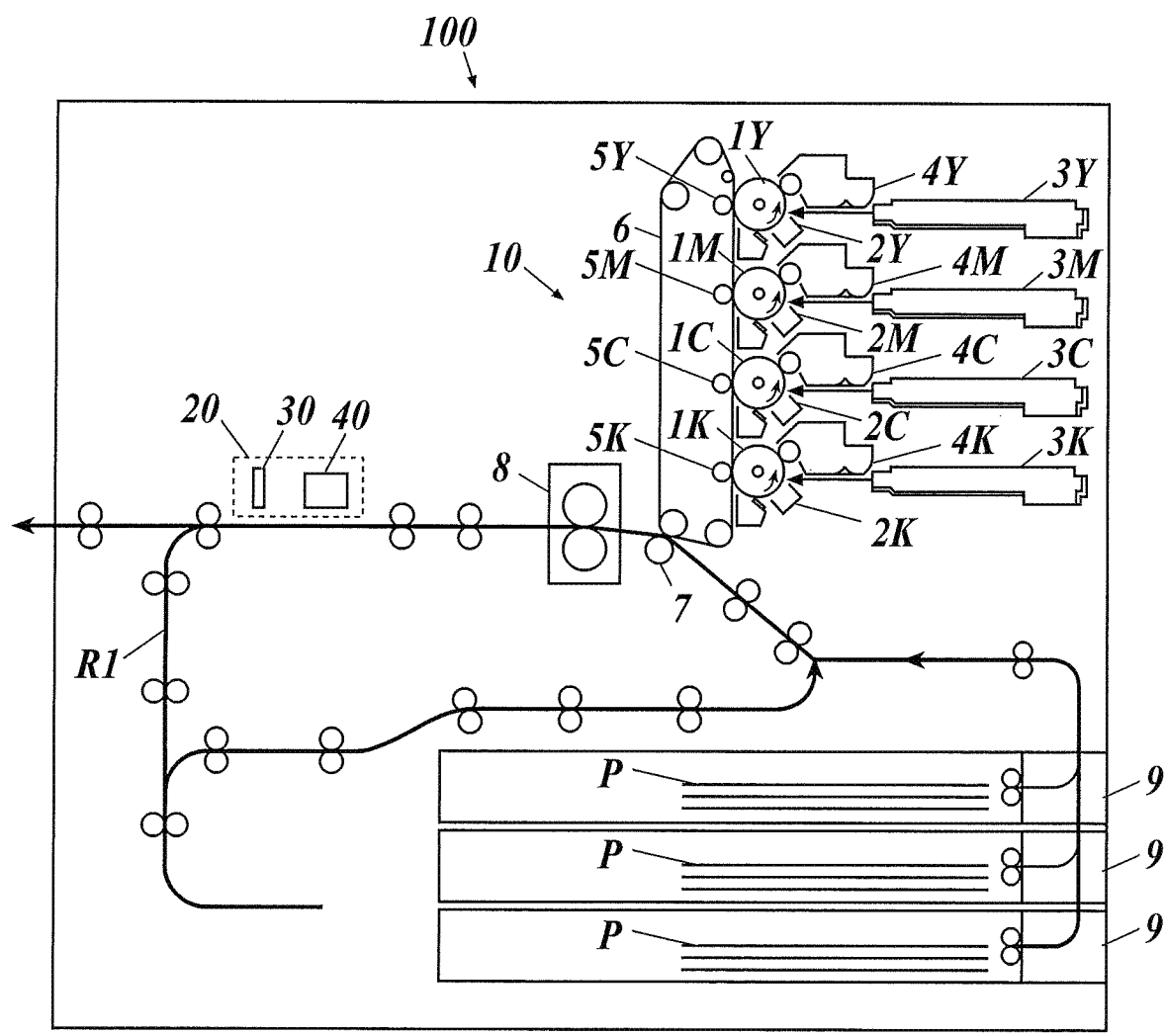
FIG. 1 is a schematic sectional view of an image forming apparatus in a first embodiment of the present invention.

FIG. 1 is a schematic sectional view of an image forming apparatus 100 in the first embodiment.

The image forming apparatus 100 includes an image forming section 10, an image reading section 20 and such like.

The image forming section 10 is for electrophotographic image formation and forms an image on a sheet P on the basis of image data corresponding to respective colors of yellow (Y), magenta (M), cyan (C) and black (K). The image forming section 10 includes photoreceptor drums 1Y, 1M, 1C and 1K, charging sections 2Y, 2M, 2C and 2K, exposing sections 3Y, 3M, 3C and 3K, developing sections 4Y, 4M, 4C and 4K, primary transferring rollers 5Y, 5M, 5C and 5K, an intermediate transfer belt 6, a secondary transfer roller 7, a fixing section 8, sheet feeding sections 9 and such like.

A yellow toner image is formed on the photoreceptor drum 1Y. The charging section 2Y uniformly charges the photoreceptor drum 1Y. The exposing section 3Y scans and exposes the surface of the photoreceptor drum 1Y with laser beams to form an electrostatic latent image on the basis of the yellow image data. The developing section 4Y attaches yellow toner to the electrostatic latent image on the photoreceptor drum 1Y to perform development.

The same processing is performed with respect to the other colors of magenta, cyan and black.

The toner images of respective colors formed on the photoreceptor drums 1Y, 1M, 1C and 1K are sequentially transferred (primary transfer) onto the intermediate transfer belt 6 by the primary transfer rollers 5Y, 5M, 5C and 5K. That is, color toner images formed of overlapping four color toner images are formed on the intermediate transfer belt 6.

The color toner images on the intermediate transfer belt 6 are transferred all at once onto one surface of the sheet P, which was fed from a sheet feeding section 9, by the secondary transfer roller 7 (secondary transfer).

The fixing section 8, which includes a heating roller heating the sheet P on which the color toner images are transferred and a pressing roller pressing the sheet P, fixes the color toner images onto the sheet P by heating and pressing.

In a case of forming images on both sides of the sheet P, the sheet P is conveyed to a conveyance path R1, both the sides are turned over, and thereafter the sheet P is conveyed to the secondary transfer roller 7 again.

The image reading section 20 includes a colorimeter 30 as a first reader and a scanner 40 as a second reader.

The colorimeter 30 and the scanner 40 are provided so as to be close to each other on a sheet conveyance path in the downstream side of the fixing section 8 in the conveyance direction of the sheet P. The colorimeter 30 and the scanner 40 can read inline (on the conveyance path in the apparatus) an adjustment pattern which is formed on the sheet P.

The colorimeter 30 is a spectrophotometer which detects spectral reflectivity of the image formed on the sheet P for each wavelength and measures the colors of the image. The colorimeter 30 outputs a Lab value as a first color value to a controller 11 (see FIG. 2). The Lab value represents a color with a numerical value by a combination of (L*, a*, b*) in the L*a*b* color space. The colorimeter 30 can read out only a partial region in the sheet width direction (direction which is orthogonal to the conveyance direction of sheet P and parallel to the sheet surface).

The scanner 40 is a line sensor which has CCDs (Charge Coupled Devices) that are arranged in lines over the entire sheet width direction, and reads out a one-dimensional image. By performing a reading operation in accordance with the timing when the sheet P having an image formed thereon is conveyed, the scanner 40 obtains a two-dimensional image formed on the sheet P. That is, the scanner 40 can read out the entire region in the sheet width direction. The scanner 40 outputs an RGB value as a second color value having a tone value of each color to the CPU 11 (see FIG. 2) for each channel of red (R), green (G) and blue (B). The RGB value represents a color with a numerical value by a combination of (R, B) in the RGB color space.

The scanner 40 may be a camera which captures a two-dimensional image.

Figure 2:
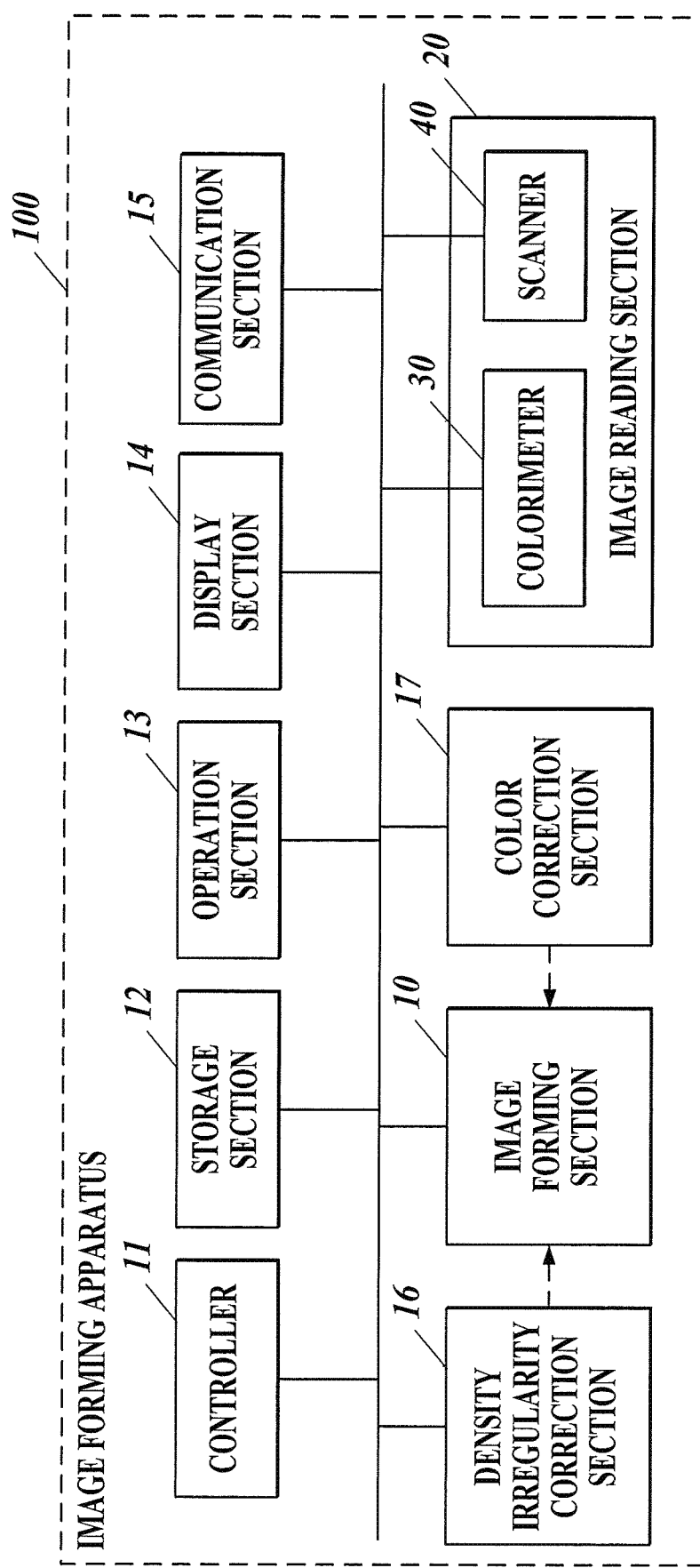
FIG. 2 is a block diagram showing a functional configuration of the image forming apparatus.

FIG. 2 is a block diagram showing a functional configuration of the image forming apparatus 100.

As shown in FIG. 2, the image forming apparatus 100 is configured by including the controller 11, a storage section 12, an operation section 13, a display section 14, a communication section 15, a density irregularity correction section 16, a color correction section 17, an image forming section 10, an image reading section 20 and such like. As for the configurations which have been already explained, the explanation is omitted.

The controller 11 is configured by including a CPU (Central Processing Unit), a RAM (Random Access Memory) and such like, and integrally controls the operations of the sections in the image forming apparatus 100 in accordance with various processing programs stored in the storage section 12.

The storage section 12 is formed of a hard disk, a flash memory and such like, and stores various processing programs and various types of data such as parameter and files necessary for executing the programs. For example, image data of an adjustment pattern including a plurality of color patches is stored in the storage section 12. The patch position and the CMYK value forming a patch are stored in the storage section 12 so as to be associated with each other for each patch included in the adjustment pattern.

The operation section 13 includes a touch panel which is formed so as to cover the display screen of the display section 14 and various operation buttons such as numeric buttons and a start button, and outputs an operation signal based on user's operation to the controller 11.

The display section 14 is configured by including an LCD (Liquid Crystal Display), and displays various screens in accordance with the instruction of a display signal input from the controller 11.

The communication section 15 transmits and receives data to and from an external device connected to a communication network such as a LAN (Local Area Network).

The density irregularity correction section 16 corrects density irregularity in the sheet width direction in the image forming section 10. For example, the density irregularity correction section 16 corrects the density irregularity by performing image processing to image data which is a target of image formation in the image forming section 10. Alternatively, the density irregularity correction section 16 may correct the density irregularity by adjusting the intensities of writing beams emitted from the exposing sections 3Y, 3M, 3C, 3K.

The color correction section 17 corrects the colors of an image to be formed by the image forming section 10 on the basis of a color correction parameter. In the image forming apparatus 100, target Lab values are determined with respect to CMYK values in advance, and the color correction section 17 calculates the color correction parameter so that the colors of the image formed by the image forming section 10 are the target Lab values.

The controller 11 controls the image forming section 10 to form the adjustment pattern including a plurality of color patches on the sheet P. When the adjustment pattern is formed by the image forming section 10, the density irregularity correction section 16 is applied.

The controller 11 obtains output values obtained by reading the plurality of patches included in the adjustment pattern from each of the colorimeter 30 and the scanner 40.

Figure 3:
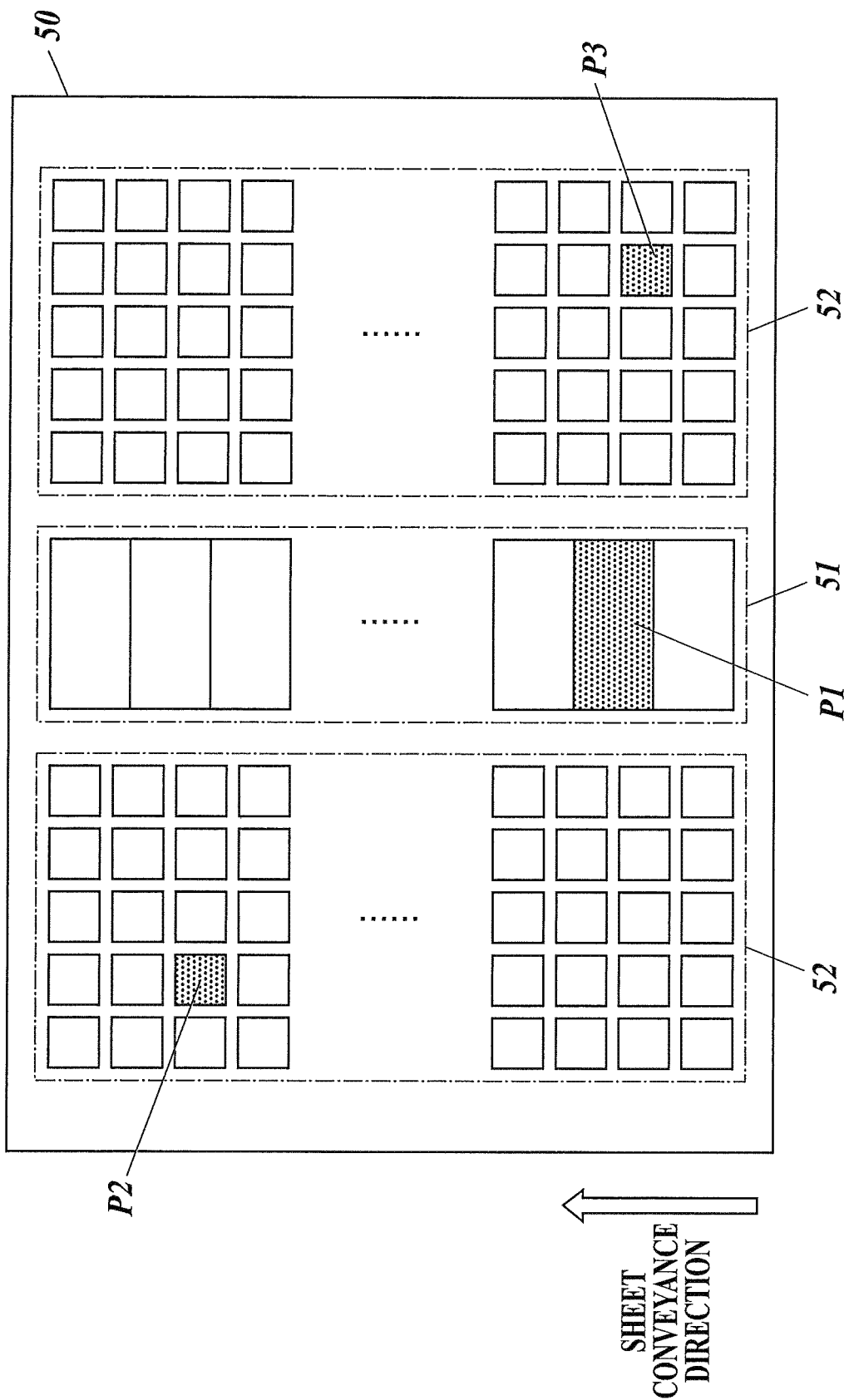
FIG. 3 is an example of a color chart in which an adjustment pattern including a plurality of patches is formed.
Figure 4:
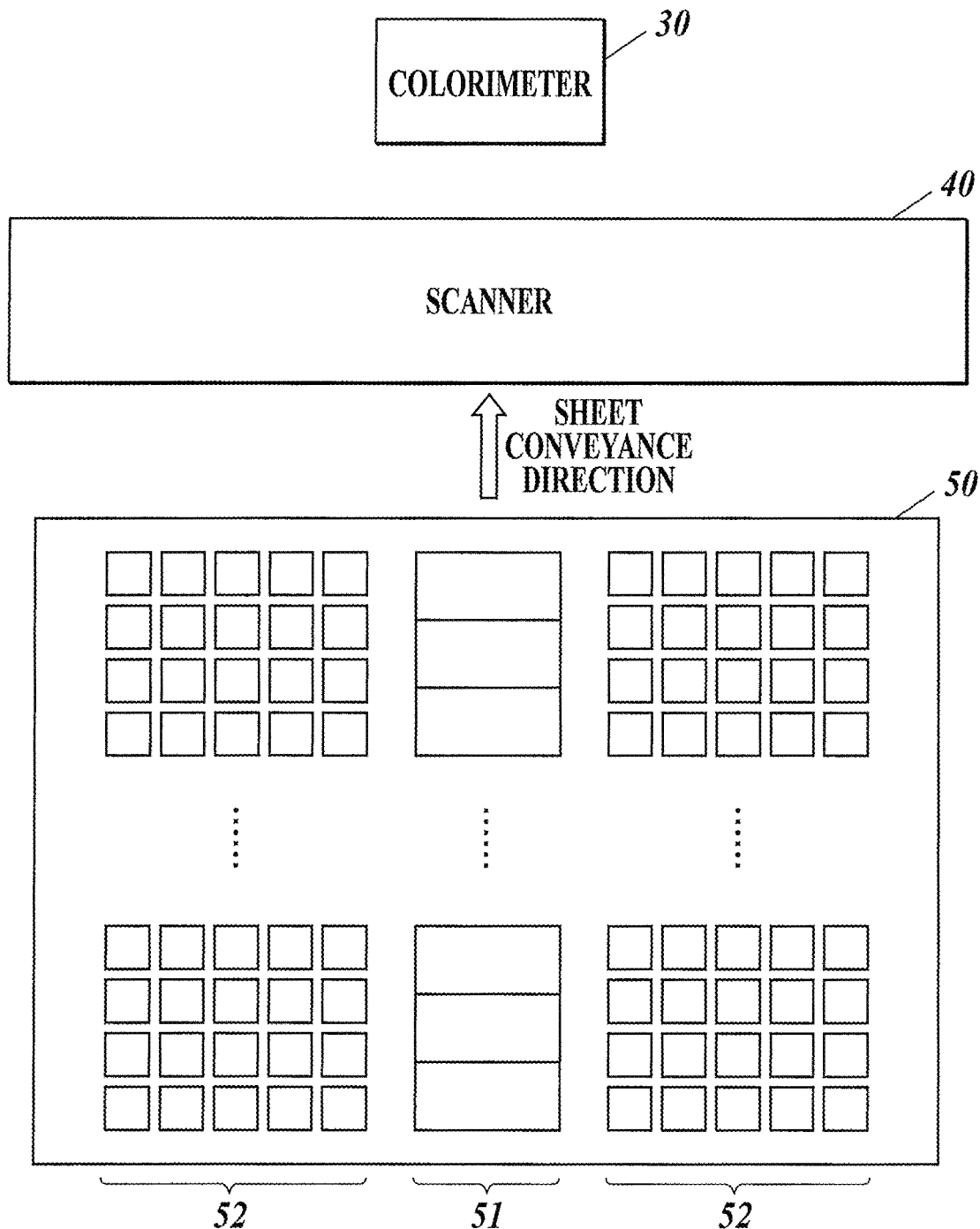
FIG. 4 is a view schematically showing the relationship between a colorimeter, a scanner and a color chart.

FIG. 3 is an example of the color chart 50 in which the adjustment pattern including a plurality of patches is formed. FIG. 4 schematically shows the relationship between the colorimeter 30, the scanner 40 and the color chart 50.

The color chart 50 includes a first patch region 51 in which patches readable by the colorimeter 30 are arranged and second patch regions 52 in each of which patches readable by only the scanner 40 are arranged. The second patch regions 52 are located at positions which the colorimeter 30 cannot measure. The patches are respectively formed in various colors of CMYK values.

Since the patch included in the first patch region 51 needs to have a size which can be stably measured by the colorimeter 30, the patch included in the first patch region 51 is larger than the patch included in the second patch regions 52. On the other hand, the patch included in the second patch regions 52 may have a size smaller than the patch included in the first patch region 51. By using patches in a small size in the second patch regions 52, many patches can be arranged in the second patch regions 52.

The second patch regions 52 include at least a common color patch which is a patch in a same color (patch defined by a same CMYK value) as a patch included in the first patch region 51. That is, the patches in same colors as the patches included in the first patch region 51 are necessarily included in the second patch region 52.

The patches in the second patch regions 52 are randomly arranged. That is, the colors of the patches are not arranged in a regular order in the second patch regions 52. It is desirable that the arrangement of the patches in the second patch regions 52 is determined by using a random pattern (blue noise and such like) with a high dispersibility.

The second patch regions 52 include a plurality of patches in a same color for a common color patch. For example, as shown in FIG. 3, the patch P1 included in the first patch region 51 and the patches P2 and P3 included in the second patch regions 52 are in the same color.

In the second patch regions 52, at least one of the patches around a common color patch is a patch in a color different from the color of the common color patch.

Figure 5:
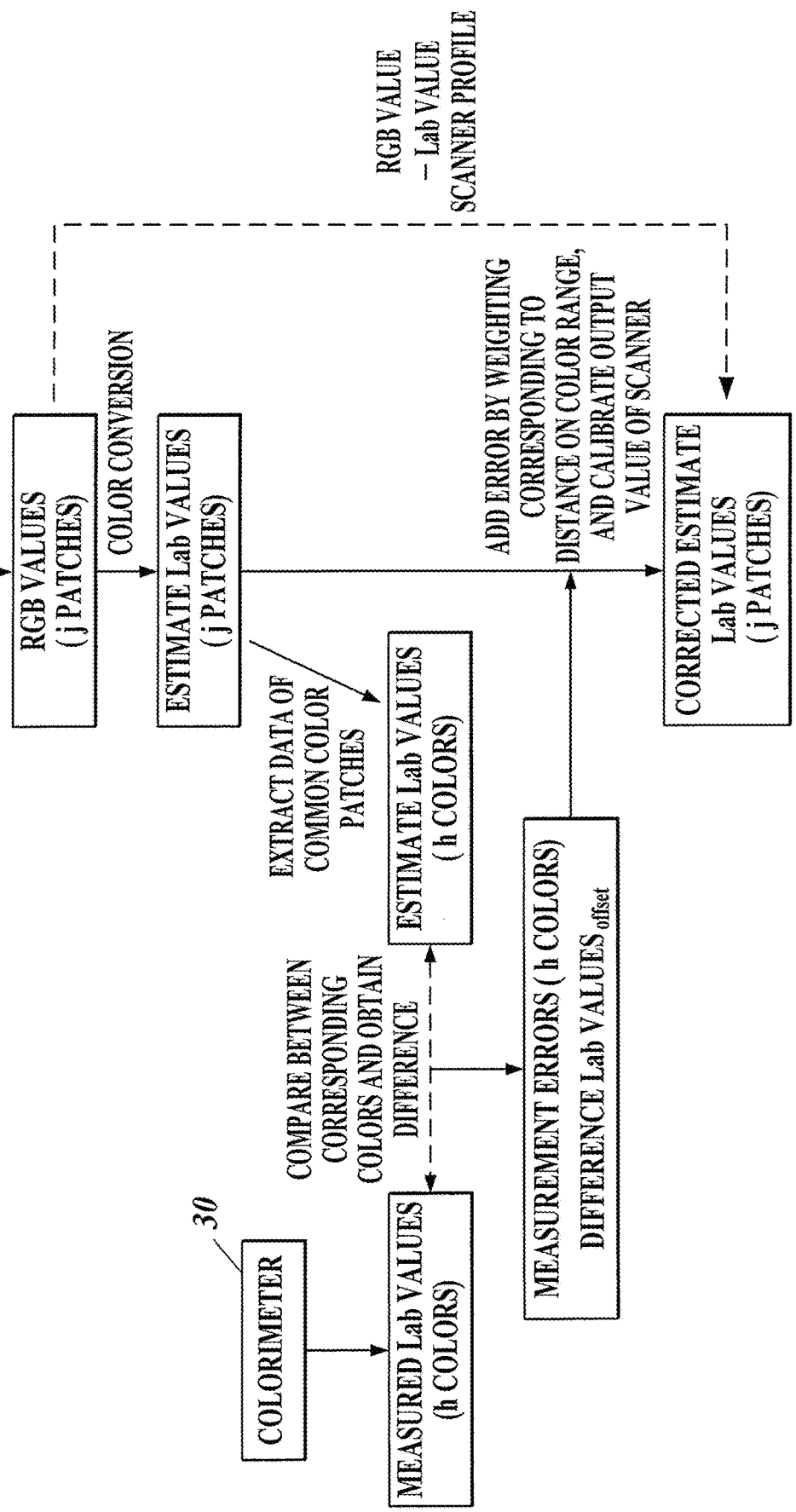
FIG. 5 is a view for explaining the summary of the present invention.

Here, the summary of the present invention will be described with reference to FIG. 5.

The controller 11 obtains Lab values (measured Lab values) from the colorimeter 30, the Lab values being obtained by reading the patches included in the first patch region 51 in the color chart 50. The number of patches included in the first patch region 51 is h.

The controller 11 obtains RGB values from the scanner 40, the RGB values being obtained by reading the patches included in the second patch regions 52 in the color chart 50. The number of patches included in the second patch regions 52 is j (j>h).

The controller 11 performs color conversion of the RGB values for the respective patches in the second patch regions 52 output from the scanner 40 into the Lab values, and obtains estimate Lab values after the conversion. That is, the estimate Lab value corresponding to each of the j patches is obtained.

The controller 11 extracts data of the common color patches (h patches) from among the estimate Lab values corresponding to respective patches in the second patch regions 52.

The controller 11 compares measured Lab values of the patches in the first patch region 51 which were output from the colorimeter 30 with the estimate Lab values obtained from the common color patches in the second patch regions 52 corresponding to the respective patches in the first patch region 51, and obtains correction values of the estimate Lab values for the respective common color patches. Specifically, in accordance with the formula (1), the controller 11 obtains, as the correction value of the estimate Lab value, the difference Lab value$_{offset}$ which is the difference between the measured Lab value obtained from the colorimeter 30 and the estimate Lab value obtained from the common color patch in the second patch region 52.

[Expression 1]

$$\text{Lab VALUE}_{offset} = \text{MEASURED Lab VALUE} - \text{ESTIMATE Lab VALUE} \quad (1)$$

When the difference Lab value offset is obtained, the difference is obtained between L* values for the L* value, between a* values for the a* value and between b* values for the b* value. That is, the Lab value offset is also formed of the combination of three values.

The controller 11 corrects the estimate Lab values obtained from all the patches in the second patch regions 52 on the basis of the correction values of the estimate Lab values for the respective common color patches. The estimate Lab values which were corrected are referred to as corrected estimate Lab values. The corrected estimate Lab values are obtained from the formula (2).

[Expression 2]

$$\text{CORRECTED ESTIMATED Lab VALUE} = \text{ESTIMATE Lab VALUE} + \sum_{i=1}^{N} Coef_i * \text{Lab VALUE}_{offset,i} \quad (2)$$

Here, the Lab value$_{offset,i}$ is the Lab value offset for i-th patch (i=1 to N) (the patch which has a same color in the first patch region 51 and the second patch regions 52), and the $Coef_i$ is the weighting coefficient for the i-th patch. The sum of $Coef_i$s is 1.

In accordance with the weighting coefficient corresponding to the similarity with respect to the target color, the controller 11 adds the difference Lab value offset for the common color patch to the estimate Lab value of the target color and corrects the estimate Lab value. That is, with the weighting corresponding to the distance on the color range, the error is added to the estimate Lab value to calibrate the output value of the scanner 40. The calculation of the corrected estimate Lab value is also performed for each component of (L*, a*, b*). The RGB value is associated with the corrected estimate Lab value for each patch and the scanner profile is created.

The controller 11 controls the color correction section 17 to calculate the color correction parameter on the basis of the corrected estimate Lab values and correct the colors of an image to be formed by the image forming section 10 on the basis of the color correction parameter.

Next, the operation of the image forming apparatus 100 in a first embodiment will be described.

Figure 6:
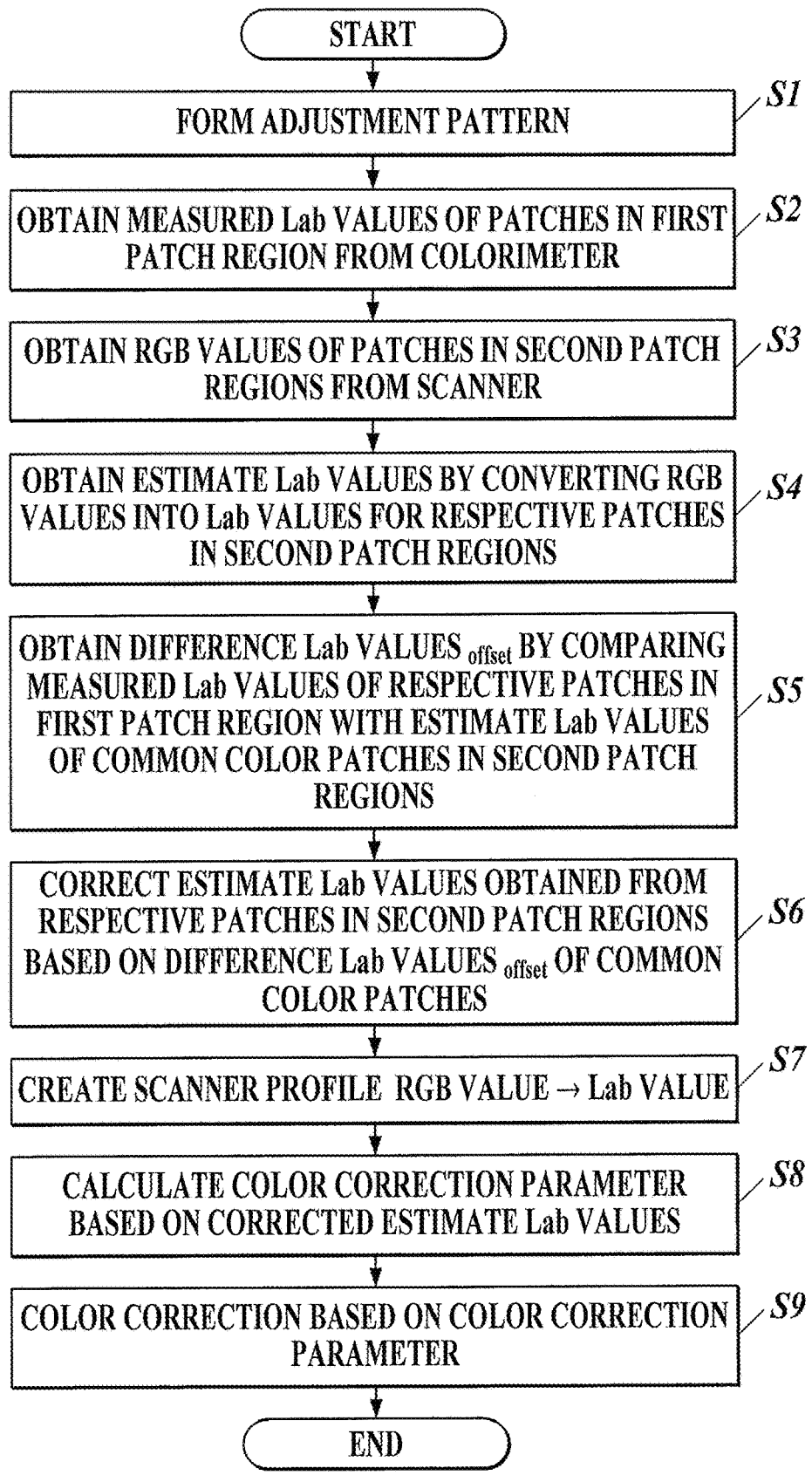
FIG. 6 is a flowchart showing image adjustment processing.

FIG. 6 is a flowchart showing image adjustment processing. The processing is achieved by software processing in cooperation between the controller 11 and the program stored in the storage section 12.

First, when the user instructs formation of the adjustment pattern by the operation from the operation section 13, the controller 11 reads image data (CMYK value) of the adjustment pattern from the storage section 12, and controls the image forming section 10 to form the adjustment pattern on the sheet P and output the color chart 50 (step S1). When the adjustment pattern is formed, the controller 11 controls the density irregularity correction section 16 to correct the density irregularity in the sheet width direction in the image forming section 10.

Next, the controller 11 obtains Lab values (measured Lab values) which were obtained by reading the patches included in the first patch region 51 of the color chart 50 from the colorimeter 30 (step S2). The controller 11 stores the obtained measured Lab values in the storage section 12 so as to be associated with the CMYK values for the respective patches.

Next, the controller 11 obtains RGB values which were obtained by reading patches included in the second patch regions 52 in the color chart 50 from the scanner 40 (step S3). As the RGB value, the average pixel value in each patch is used. The controller 11 stores the obtained RGB values in the storage section 12 so as to be associated with the CMYK values for the respective patches. Data may be rearranged by sorting the obtained data in the order increasing the density of cyan, for example.

Next, the controller 11 obtains the estimate Lab values which were obtained by converting the RGB values of respective patches in the second patch regions 52 output from the scanner 40 into the Lab values (step S4). A conversion table which was prepared in advance is used for conversion from the RGB values into the Lab values.

Next, the controller 11 compares the measured Lab value of each patch in the first patch region 51 output from the colorimeter 30 with the estimate Lab value obtained from the common color patch in the second patch region 52 corresponding to the patch in the first patch region 51, and obtains the correction value (Lab value offset) of the estimate Lab value for each of the common color patches in accordance with the above formula (1) (step S5).

In a case where the second patch regions 52 include a plurality of patches in a same color for a common color patch, the controller 11 obtains the average value of the estimate Lab values obtained from the plurality of patches, and sets the average value as the estimate Lab value of the common color patch. The controller 11 obtains the correction value of the estimate Lab value corresponding to the common color patch on the basis of the average value of the estimate Lab values.

Next, the controller 11 corrects the estimate Lab values obtained from all the patches included in the second patch regions 52 on the basis of the correction values (Lab values offset) of the estimate Lab values for the respective common color patches (step S6). Specifically, the controller 11 obtains the corrected estimate Lab values in accordance with the above formula (2).

Next, the controller 11 associates the RGB value of each patch in the second patch regions 52 obtained in step S3 with the corrected estimate Lab value (corrected estimate Lab value) of each patch obtained in step S6 and creates a scanner profile for converting the RGB values into the Lab values (step S7).

Next, the color correction section 17 calculates the color correction parameter on the basis of the CMYK values corresponding to respective patches included in the second patch regions 52 and the corrected estimate Lab values (corrected estimate Lab values) corresponding to respective patches obtained in step S6 (step S8). As the color correction parameter, there is used a parameter of a color profile, a calibration LUT (look up table), gamma correction and such like. The controller 11 stores the color correction parameter in the storage section 12.

Thereafter, the controller 11 controls the color correction section 17 to correct the colors of an image to be formed by the image forming section 10 on the basis of the calculated color correction parameter, and controls the image forming section 10 to perform image formation (step S9).

As described above, the image adjustment processing ends.

As described above, according to a first embodiment, patches in a same color which are arranged in different regions are respectively read by the colorimeter 30 and the scanner 40, the Lab value output by the colorimeter 30 is compared with the estimate Lab value obtained by converting the RGB value output from the scanner 40, the correction value of the estimate Lab value is obtained for each of the common color patches, and the estimate Lab values obtained from all the patches read by the scanner 40 are corrected on the basis of the correction values of the estimate Lab values which were obtained for the respective common color patches. By enabling the conversion of the RGB value output from the scanner 40 into the corrected estimate Lab value, the scanner 40 can perform colorimetry with high accuracy and high efficiency. By dividing the reading region (first patch region 51) of the colorimeter 30 from the reading region (second patch regions 52) of the scanner 40, it is possible to obtain the RGB values obtained by reading the actual patches from the scanner 40 regardless of the presence/absence of the influence of flare and correctly associate the RGB values with the Lab values obtained from the colorimeter 30.

By making the size of the patch included in the first patch region 51 larger than the patch included in the second patch regions 52, the patch included in the first patch region 51 can be measured stably by the colorimeter 30. On the other hand, by making the size of patch included in the second patch regions 52 small, many patches can be arranged in the second patch regions 52, and calibration of the scanner 40 can be performed accurately.

The patches in the second patch regions 52 are arranged randomly. In a case where the second patch regions 52 include a plurality of patches in a same color for a common color patch, the average value of the estimate Lab values obtained from the plurality of patches is obtained, and the average value is set as the estimate Lab value of the common color patch. Thereby, stable reading data can be obtained from the scanner 40, the influence of flare and such like can be suppressed, and thus the reading accuracy can be improved.

In the first embodiment, the average value of the estimate Lab values obtained from the plurality of patches in the same color is obtained for a common color patch and set as the estimate Lab value of the common color patch. However, the average value of the RGB values of the plurality of patches of a same color may be obtained for the common color patch, and the value obtained by converting the average value of the RGB values into the Lab value may be set as the estimate Lab value of the common color patch.

When the adjustment pattern is formed, the density irregularity correction section 16 corrects the density irregularity in the sheet width direction in the image forming section 10. Thus, stable reading data can be obtained from the colorimeter 30 and the scanner 40 while suppressing the influence of the density irregularity.

The color correction section 17 calculates the color correction parameter on the basis of the corrected estimate Lab values and corrects the colors of an image to be formed by the image forming section 10 on the basis of the color correction parameter. Thus, the reading result of the scanner 40 can be reflected in the image formation, and color correction can be performed accurately.

Since at least one of the patches around the common color patch has a different color from the common color patch in the second patch regions 52, calibration of the scanner 40 can be performed accurately in such a state that flare is generated at the time of reading by the scanner 40.

Second Embodiment

Next, the second embodiment to which the present invention is applied will be described.

Since the image forming apparatus in the second embodiment has a similar configuration as that of the image forming apparatus 100 shown in the first embodiment, FIGS. 1 and 2 are used and the illustration and description of the configuration will be omitted. The arrangement of the first patch region 51 and the second patch regions 52 in the color chart is also similar to the arrangement shown in FIGS. 3 and 4. Hereinafter, the configuration and the processing which are characteristic to the second embodiment will be described.

The controller 11 performs smoothing processing to estimate Lab values which were obtained from each common color patch and the patches which have colors close to the common color patch in the second patch regions 52, thereby determines the estimate Lab value corresponding to the common color patch, and obtains the correction value of the estimate Lab value corresponding to the common color patch on the basis of the estimate Lab value after the smoothing processing. The color close to the common color patch is a color which has a color value in a predetermined range from the common color patch when the color is represented by a color value in a color space.

Specifically, the controller 11 extracts estimate Lab values which were obtained from the common color patch and the patches which have colors close to the common color patch included in the second patch regions 52, and obtains a moving average of the estimate Lab values along the RGB value obtained from each patch or the CMYK value when forming each patch.

Figure 7:
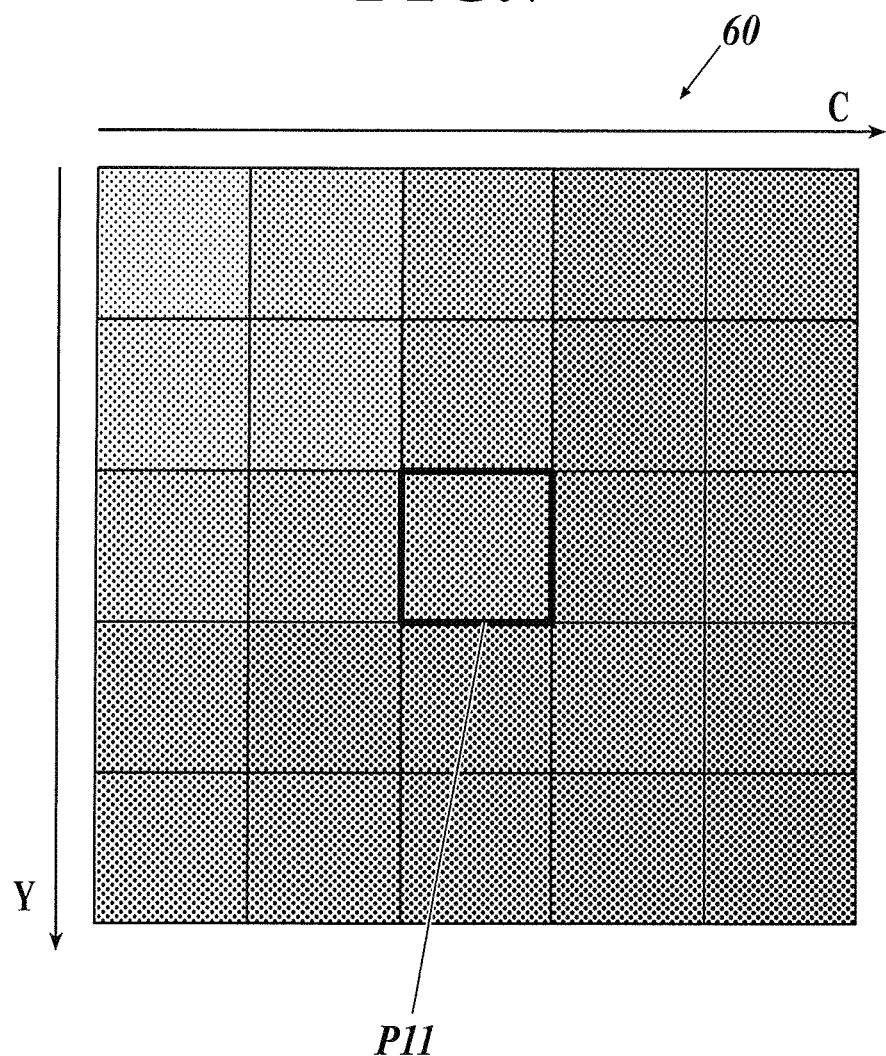
FIG. 7 is an example of a patch group included in a second patch region of a color chart used by an image forming apparatus in a second embodiment of the present invention.

The second patch regions 52 include a patch group 60 shown in FIG. 7, for example. The patch group 60 has 25 patches of 5×5, gradually changes the density of cyan in one direction and gradually changes the density of yellow in the direction orthogonal to the one direction. Though FIG. 7 emphasizes the color difference between patches, the colors are actually within a close range. The central patch P11 in the patch group 60 corresponds to the common color patch.

The controller 11 first obtains RGB values which were obtained by reading the respective 25 patches from the scanner 40, and obtains the estimate Lab values by converting the RGB values of the respective patches into the Lab values. The controller 11 performs smoothing processing of the estimate Lab values calculated for the respective patches. For example, an average value of the 25 estimate Lab values is obtained to determine the estimate Lab value corresponding to the central patch P11. A weighted average may be obtained according to the degree of color differences between the central patch P11 and the surrounding patches.

The operation in the second embodiment is nearly similar to the image adjustment processing shown in FIG. 6.

However, in step S4, when the estimate Lab value of the common color patch in the second patch regions 52 is obtained, there is used a value obtained by smoothing processing of the estimate Lab values obtained from the central patch P11 and the respective patches (patches which have colors close to the common color patch) around the central patch P11 in the above-mentioned patch group 60.

In step S6, when the estimate Lab value of each patch other than the central patch P11 in the patch group 60 is corrected, the correction value (Lab value offset) obtained for the central patch P11 is directly added to the estimate Lab value of the target patch. That is, the corrected estimate Lab value of each patch other than the central patch P11 in the patch group 60 corresponds to the value calculated in the above formula (2) in which the weighting coefficient of the central patch P11 is 1 and the weighting coefficient of each of the other common color patches is 0.

As described above, according to the second embodiment, patches in a same color which are arranged in different regions are read by the colorimeter 30 and the scanner 40, the Lab value output by the colorimeter 30 is compared with the estimate Lab value obtained by converting the RGB value output from the scanner 40, the correction value of the estimate Lab value is obtained for each of the common color patches, and the estimate Lab values obtained from all the patches read by the scanner 40 are corrected on the basis of the correction values of the estimate Lab values for the respective common color patches. By enabling conversion of the RGB values output from the scanner 40 into the corrected estimate Lab values, the scanner 40 can perform colorimetry with high accuracy and high efficiency.

Furthermore, since the estimate Lab value corresponding to the common color patch is determined by performing smoothing processing to the estimate Lab values obtained from the common color patch and the patches which have colors close to the common color patch in the second patch regions 52, stable reading data can be obtained from the scanner 40, and the reading accuracy can be improved.

In the second patch regions 52, the common color patch and the patches which have colors close to the common color patch may be arranged in accordance with the degree of color change such as the order of density. However, the positions are not limited as long as the patches are located within the second patch regions 52. That is, patches which have physically similar colors may not be necessarily arranged to be close to each other, and the reading data of the patches which are arranged at random positions may be extracted to be used in the smoothing processing.

The description in the above embodiments is an example of the image forming apparatus according to the present invention, and the present invention is not limited to this. Changes can be appropriately made within a scope of the present invention for the detailed configurations and the detailed operations of the sections forming the apparatus.

For example, instead of performing the above-mentioned calibration of the scanner 40 in the image forming apparatus, reading data may be obtained from the colorimeter 30 and the scanner 40 to calculate the correction values of the estimate Lab values in an external computer apparatus such as a server.

Though the above embodiments have been described by taking, as an example, the Lab value as the first color value which is output from the colorimeter 30, the first color value may be the XYZ value, the density value and such like.

Although embodiments of the present invention have been described and illustrated in detail, it is clearly understood that the same is by way of illustration and example only and not limitation, the scope of the present invention should be interpreted by terms of the appended claims.

What is claimed is:

1. An image forming apparatus that prints an adjustment pattern on a sheet, the adjustment pattern being for correcting a color value obtained by reading a second patch region on the sheet with a second reader based on a color value obtained by reading a first patch region on the sheet with a first reader, the apparatus comprising:
    a generator that generates image data of the adjustment pattern; and
    an image former that performs printing on the sheet based on the image data, wherein
    the adjustment pattern includes a first patch printed in the first patch region and a second patch printed in a region other than the first patch region in the second patch region,
    the second patch includes a common color patch in a same color as a color of the first patch, and
    a size of the first patch is larger than a size of the second patch.

2. The image forming apparatus according to claim 1, wherein the second patch region is wider than the first patch region.

3. The image forming apparatus according to claim 1, wherein the second patch region includes a plurality of common color patches in the same color, each of the common color patches being the common color patch.

4. The image forming apparatus according to claim 3, wherein
    the first patch region is a partial region in a sheet width direction,
    second patch regions are on both sides of the first patch in the sheet width direction, each of the second patch regions being the second patch region, and
    each of the second patch regions on the both sides includes the common color patch in the same color.

5. The image forming apparatus according to claim 1, wherein the first reader and the second reader are disposed on a conveyance path of the sheet printed by the image former.

6. The image forming apparatus according to claim 5, further comprising a hardware processor, wherein
    the first reader outputs a first color value,
    the second reader outputs a second color value, and
    the hardware processor obtains an estimate first color value by converting a second color value of the common color patch in the second patch region which is output by the second reader into a first color value,
    the hardware processor obtains a correction value of the estimate first color value for each common color patch by comparing a first color value of a patch in the first patch region which is output by the first reader with the estimate first color value obtained from the common color patch in the same color as the color of the patch in the first patch region, and
    the hardware processor corrects the estimate first color value obtained by converting a second color value of a color other than the color of the common color patch based on the correction value of the estimate first color value of the common color patch.

7. An image forming apparatus, comprising:
    an image former, which forms an adjustment pattern on a sheet;
    a first reader, which is disposed on a conveyance path of the sheet and outputs a first color value by reading the adjustment pattern, and
    a second reader, which is disposed on the conveyance path of the sheet and outputs a second color value that is different from the first color value by reading the adjustment pattern; and
    a hardware processor, wherein
    the first reader reads a partial region in a sheet width direction,
    the second reader is configured to read at least a region other than the partial region in the sheet width direction,
    the adjustment pattern has a first patch region in which a patch that is readable by the first reader is arranged and a second patch region in which a patch that is readable by the second reader in the region other than the region read by the first reader is arranged, wherein the patch in the first patch region is larger than the patch in the second patch region,
    the hardware processor obtains an estimate first color value corresponding to a color of each patch in the first patch region by converting a second color value of the patch in the second patch region which is output by the second reader into a first color value,
    the hardware processor obtains a correction value of the estimate first color value for each color of the patch in the first patch region by comparing a first color value of the patch in the first patch region which is output by the first reader with the estimate first color value obtained from the patch in the second patch region, and
    the hardware processor corrects the estimate first color value obtained by converting a second color value obtained from each patch in the second patch region based on the correction value of the estimate first color value.

8. The image forming apparatus according to claim 7, wherein
    the second patch region includes at least a common color patch which is a patch in a same color as a color of the patch included in the first patch region,
    the hardware processor obtains an estimate first color value corresponding to the color of each patch in the first patch region by converting a second color value of the common color patch in the second patch region which is output by the second reader into a first color value.

9. The image forming apparatus according to claim 8, wherein patches in the second patch region are randomly arranged, and the second patch region includes a plurality of patches in a same color for the common color patch, and the hardware processor obtains the correction value of the estimate first color value corresponding to the common color patch based on an average value of estimate first color values which are obtained from the patches in the same color for the common color patch in the second patch region.

10. The image forming apparatus according to claim 8, wherein the hardware processor determines the estimate first color value corresponding to the common color patch by performing smoothing processing to estimate first color values which are obtained from the common color patch and a patch in a color close to a color of the common color patch in the second patch region, and obtains the correction value of the estimate first color value corresponding to the common color patch based on the estimate first color value after the smoothing processing.

11. The image forming apparatus according to claim 8, further comprising:

a density irregularity corrector which corrects density irregularity in the image former, wherein the image former applies the density irregularity corrector when the image former forms the adjustment pattern.

12. The image forming apparatus according to claim 8, further comprising:

a color corrector which calculates a color correction parameter based on the corrected estimate first color value and corrects a color of an image to be formed by the image former based on the color correction parameter.

13. The image forming apparatus according to claim 8, wherein at least one patch around the common color patch in the second patch region is a patch in a color which is different from the color of the common color patch.

14. The image forming apparatus according to claim 8, wherein the first reader is a colorimeter, and the second reader is a line sensor.

15. The image forming apparatus according to claim 8, wherein the first color value is a Lab value, an XYZ value or a density value, and the second color value is an RGB value.

\* \* \* \* \*